No. 738,402. PATENTED SEPT. 8, 1903.
E. BRAUBURGER.
SHUTTER FOR PHOTOGRAPHIC OBJECTIVES.
APPLICATION FILED NOV. 26, 1902.
MODEL. 3 SHEETS—SHEET 2.
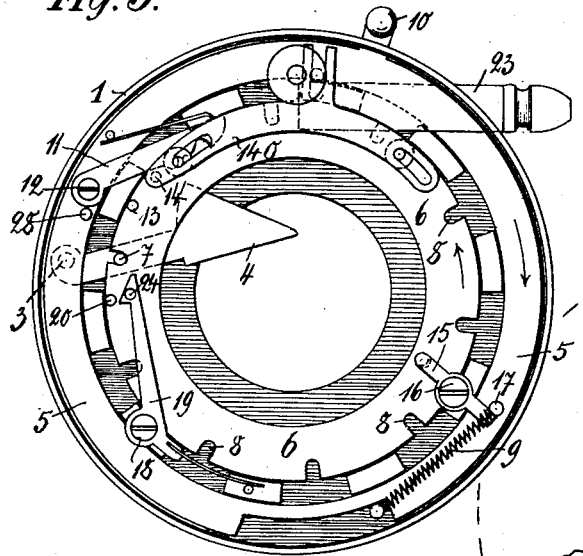
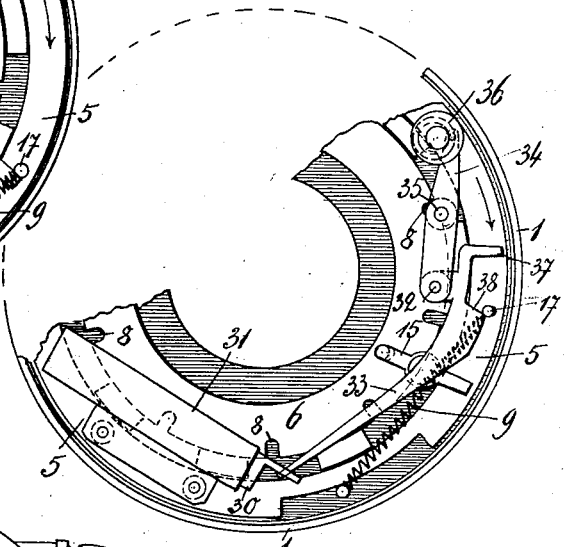
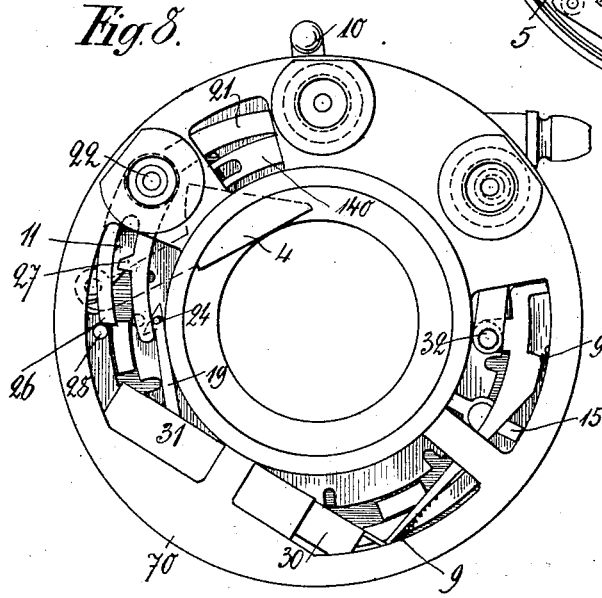
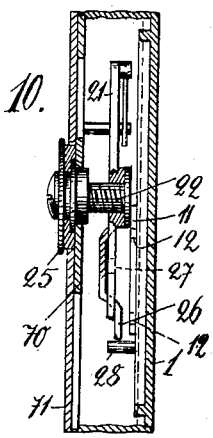
Witnesses
Wm Gillman Jr
H. E. Hansmann.
Inventor
Ernst Brauburger
by Foster & Freeman
Attorneys.

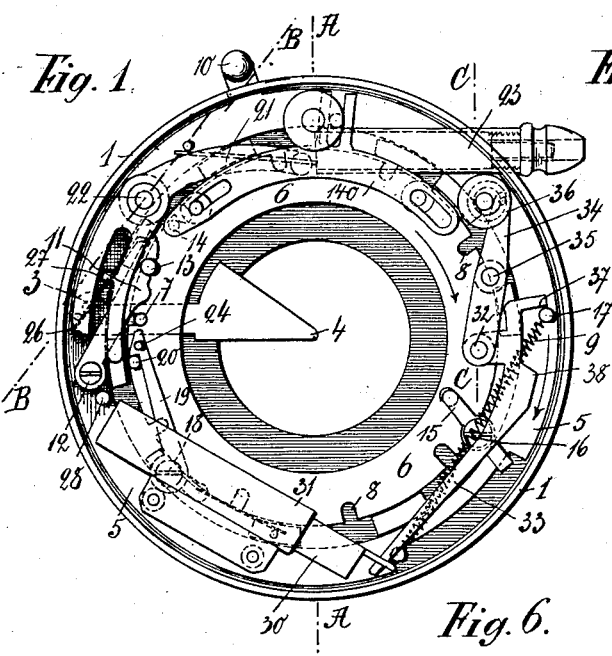

No. 738,402. PATENTED SEPT. 8, 1903.
E. BRAUBURGER.
SHUTTER FOR PHOTOGRAPHIC OBJECTIVES.
APPLICATION FILED NOV. 26, 1902.
MODEL. 3 SHEETS—SHEET 3.
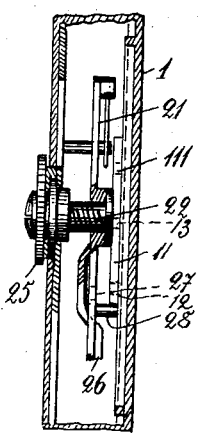
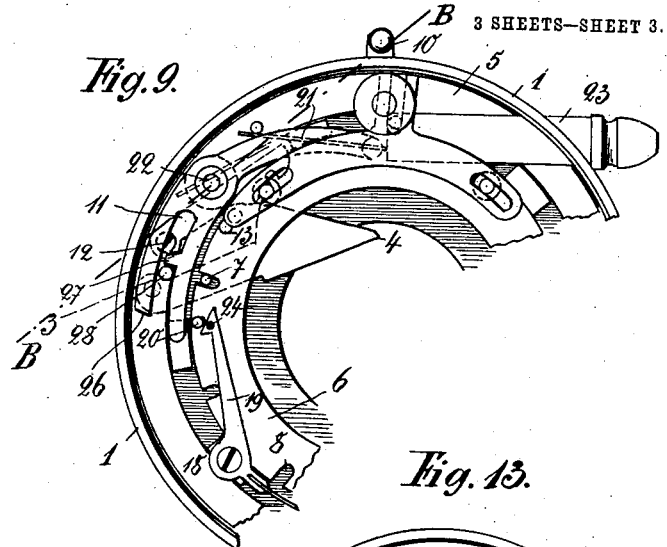
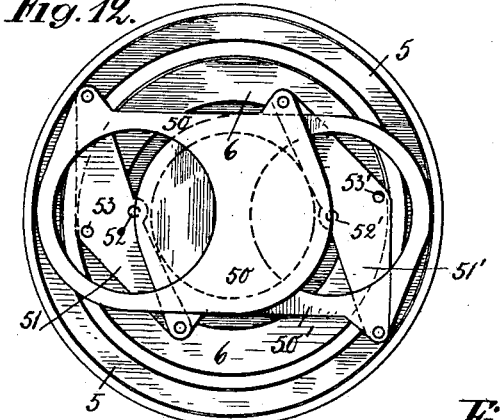
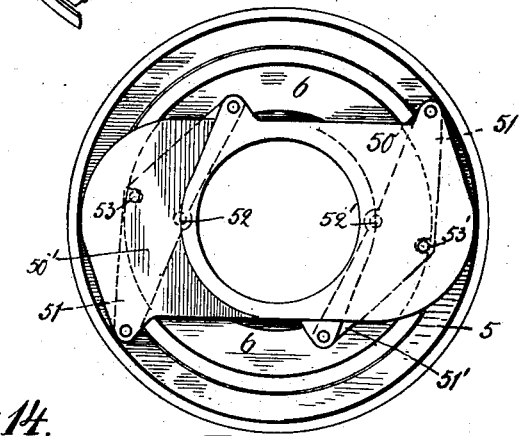
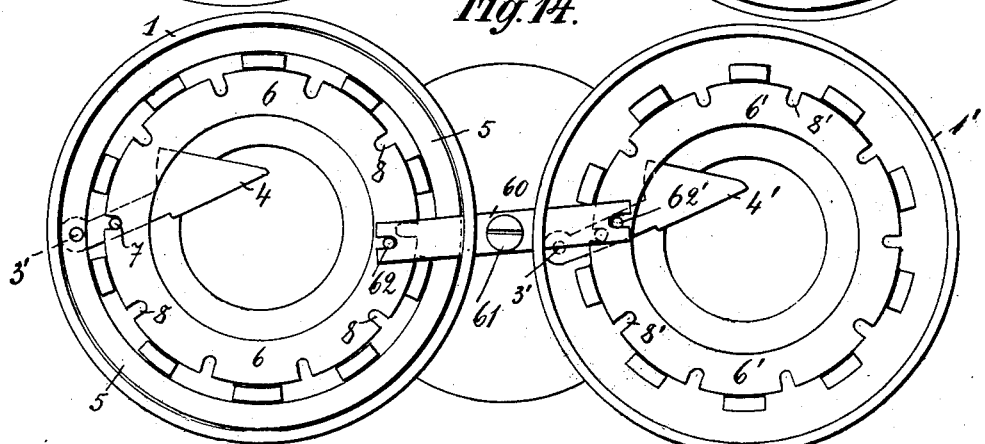

No. 738,402. Patented September 8, 1903.

UNITED STATES PATENT OFFICE.

ERNST BRAUBURGER, OF STEGLITZ, GERMANY, ASSIGNOR TO FIRM OF C. P. GOERZ, OF FRIEDENAU, NEAR BERLIN, GERMANY.

SHUTTER FOR PHOTOGRAPHIC OBJECTIVES.

SPECIFICATION forming part of Letters Patent No. 738,402, dated September 8, 1903.

Application filed November 26, 1902. Serial No. 132,926. (Model.)

*To all whom it may concern:*

Be it known that I, ERNST BRAUBURGER, a subject of the Emperor of Germany, and a resident of 113 Schloss-strasse, Steglitz, near Berlin, Germany, have invented certain new and useful Improvements in Shutters for Photographic Objectives, of which the following is a specification.

This invention relates to a shutter for photographic objectives the obturating disks or sectors of which are moved by turning a ring so as to open and shut the objective.

The novel or essential feature of this invention consists in a special combination of the ring which actuates the obturating or shutting disks or sectors with a second ring in such a manner that one ring encompasses the other and that means have been provided for actuating the second ring and connecting and disconnecting the same with the first ring, the latter thereby being successively turned in opposite directions.

The invention is illustrated by the accompanying drawings, wherein similar numbers refer to similar parts throughout the several views.

Figure 1 shows the shutter mechanism with the lid removed adjusted for an instantaneous exposure with bent spring and ready for exposure. Figs. 2 and 3 show two different reciprocal positions of the parts of the mechanism of a sector-shutter during release. Fig. 4 is a section on the line A A of Fig. 1. Figs. 5 and 6 are sections on the lines B B and C C of Fig. 1. Figs. 7 to 11 show the shutter adjusted for a time exposure, in different positions of release, in a top or plan view and section on the line B B of Figs. 1 and 8. Figs 12 and 13 show in what manner this same principle of construction may be applied to a plate-shutter. Fig. 14 shows a shutter mechanism of this kind applied to stereoscopic cameras.

1 is a flat case carrying the objective 2. At the bottom of case 1 are arranged the sector-plates 4, which are pivotable around pin 3.

5 and 6 are two annular disks arranged concentrically and resting at the bottom of case 1. The plates 4 are provided with pins which engage in slot 8 of the annular disk 6.

9 is a spring, fastened at one end to the case and at the other to the outer annular disk 5.

10 is a handle fixed to the annular disk 5, which is projecting from the case and allows of the disk 5 being turned in a direction contrary to the tension of the spring.

11 is a catch which is journaled on a pin 12 of the disk 5 and is governed by a spring 110, which tends to turn the mouth 111 of the catch against the inner annular disk 6. The inner annular plate 6 is provided with a pin 13, which can be caught by the mouth 111 of the catch 11 when the two annular disks 5 and 6 are in a certain reciprocal position.

14 is a buffer or stop adapted to disengage the catch from the pin 13 when the catch 11 strikes against the stop 14. The stop 14 is fixed to a bow movably arranged on the lid of the case.

15 is a two-armed lever which turns on the pin 16, fixed at the bottom of the case. The lever 15 is at one end connected to the ring 6 in such a manner that the ring 6 and the lever 15 may be turned interdependently. The other end of the lever 15 projects into the path of a catch 17, attached to the outer annular disk 5.

19 is a spring-pawl which turns on a pin 18 at the bottom of the case and is adapted to catch a pin 20 of the inner annular disk 6.

24 is a pin fixed to the pawl 19, the operation of which will be indicated later on.

21 is a two-armed lever which turns on a threaded pin 22 on the lid of the case and which can be turned from its ordinary position by any suitable device—for instance, by means of a pneumatically-actuated piston 23, as shown in the drawings. The screw 25 allows of the lever being adjusted at a greater or less distance from the bottom of the case. That end of the lever 21 which is turned toward the ratchet-lever 19 is forked. The branches of the fork are designated by 26 and 27.

28 is a projection on the annular disk 5, which according to the position of the lever 21 either strikes against the branches 26 or 27 of the fork or passes underneath when the annular disk 5 is turned.

The operation of the device as far as it has hereinbefore been described is as follows: When an instantaneous view is to be taken, the lever 21 is so adjusted that on turning the annular disk 5 the projection 28 passes underneath the lever without touching the same. This case is shown by Figs. 1 to 5. If now the piston 23 is pressed upon and thereby the lever 21 turned from its position of rest, the forked end of said lever 21 strikes against the pin 24 of the pawl 19, so that the same releases the pin 20 of the annular disk 6. The outer annular disk 5 is thereby allowed to obey the tension of the spring 9 and to turn in the direction of the arrow, as shown in Figs. 1 to 3. As the disk 5 is coupled to the disk 6 through the catch 11, which engages with its mouth 111 pin 13 of the disk 6, (see Fig. 1,) said disk 6 is moved by disk 5. This causes the sectors 4 to turn on their pivots 3 and the shutter is opened. As soon as this is done the catch 11 strikes against stop 14, by which the mouth 111 of the catch is put out of contact with pin 13 of disk 6. The consequence thereof is that disk 6 remains stationary, whereas disk 5 continues to turn, owing to the action of spring 9. Pin 17 of disk 5 hereby strikes against lever 15 and turns the same on its trunnion 16. The turning of lever 15 has for its consequence a return movement of the annular disk 6, as shown in Fig. 3 by the arrow. By this means the sectors 4 are turned back into their original position, in which they close the aperture of the objective; also a pin 20 of disk 6 is again caught by pawl 19. If now disk 5 by turning the handle 10 is also brought back into its original position, in which the mouth 111 of the catch 11 catches pin 13 of disk 6 and thereby stops disk 5, the apparatus is again in the position represented in Fig. 1. By a suitable adjustment of the bow 140 catch 11 can be disengaged from pin 13 sooner or later, and the aperture of the sectors 4 can thus be regulated as required. If a determined exposure is to be made, lever 21 is lowered by turning the screw 25, so that the branches 26 and 27 of the fork project into the path of projection 28. If now the closing mechanism is released by a pressure on the piston 23, by which lever 21 through a pressure against pin 24 pushes the pawl 19 aside, so that the same releases the pin 20, the projection 28 during the turning of the annular disk 5 strikes against the branch 26 of the fork. The consequence of this is that the turning of the ring is interrupted after sectors 4 having previously been opened in the same manner, as hereinbefore described, for instantaneous exposures. If now the piston 23 is released, lever 21 returns under the pressure of a spring to its normal position, when the branch 26 of the fork releases the projection, so that the disk 5 can turn again; but this new turning is again interrupted by the projection 28 striking against the second branch 27 of the fork of the lever 21, which now lies in the path of the projection 28. The disk 6 having been disconnected from disk 5, disk 6 remains stationary during this time and the shutter is opened. By a renewed pressure on the piston 23 lever 21 is again turned, and thereby definitely brought out of the path of projection 28. Disk 5 can now complete its turn under the actuation of spring 9 and can thereby by means of the pin 17 striking against the lever 15 bring disk 6 and sectors 4 back to their initial position in the manner already described for instantaneous exposures. The setting of the shutter mechanism again takes place in the same way as hereinbefore described for instantaneous exposures—namely, by turning the disk 5 by means of the handle 10.

In order to be able to change the duration of instantaneous exposures, during which the shutter remains completely open, the time during which the disk 5 turns independent of disk 6 can be more or less prolonged by means of a piston 30, moving in a cylinder 31. This piston is actuated by a two-armed lever 33, turning on a stud 32. The stud 32 is fixed at the end of a lever 34, which turns on a stud 35, fixed to the lid of the case and the position of which can be regulated by a disk 36, provided with an eccentric groove. Pin 17 of annular disk 5 can according to its different positions modify the action of the lever 33. If the lever 33 is as far to the left as it can go, Figs. 1 and 2, pin 17 can on disk 5 being turned pass without touching the lever. If, however, the lever 33 by turning the disk 36 is moved farther to the right, Fig. 7, the projection 17 will stand between its shoulders 37 and 38. On disk 5 being released pin 17 will strike against shoulder 38, Fig. 7, the sectors having got into the open or exposure position and will effect a turning of the lever 33 on its pivot 32; but as the end of 33 bears on piston 30 the latter must recede in its cylinder till pin 17 can glide off from shoulder 38 and proceed in its course. How far the piston requires to be pressed into the cylinder in order to allow the gliding off of pin 17 from the shoulder 38 depends on the adjustment of the pivot 32 of lever 33. One can therefore change at will the time the pin 17 requires to glide off from shoulder 38 and during which the shutter is kept open by changing the position of this pivot. On setting the shutter pin 17 strikes against the shoulder 37, and thereby causes the retreat of lever 33 into the initial position, which causes the piston to come out of the cylinder. It will be seen from this that the here described mechanism can also be adapted to shutters having two plates with sectors moving in opposite directions, whereby the sectors either cover one another or stand against the not-perforated part of the other plate.

A shutter mechanism of this kind is shown in Figs. 12 and 13. 50 and 50' are the two plates, both having a circular cut. These two cuts overlap each other on the plates being moved toward each other and thus open the exposure-aperture. When moved away from each other, Fig. 12, the cuts are outside of the axis of the objective and both stand against the opaque part of the other plate. Both plates are actuated by levers 51 and 51', which are usually of the shape of a long and narrow triangle. These levers turn on studs 52, fixed at the bottom of the case and which engage in the middle of the hypotenuse of the triangle. The two ends of the hypotenuse are each jointed to one of the plates. A pin 53 on the annular disk 6 engages near the vertex of the triangular lever 51. It will at once be evident that on the ring 6 being turned in the direction of the arrow levers 51 will be turned around stud 52 and effect a sliding of the plates toward each other, whereas by being turned in the opposite direction the plates will be moved away from each other. As actuating device for the rings 5 and 6 serves the above-described one. This shutter can also be used for stereoscopic cameras, as shown in Fig. 14 of the drawings. One of the cases is fitted with the above-described mechanism, while the other contains only the plates 4', pivoting on studs 3', and the movable disk 6' for the setting of the same. A uniform movement of the disks 6 and 6', and consequently also of the sector-plates, is attained by a two-armed lever 60, which turns on a stud fixed half-way between the centers of the two cases 1 and 1' and which engages with its slotted ends the projections 62 and 61' on the plates 6 and 6'. In this way a perfectly synchronical working of both shutters is attained by means of one single actuating mechanism.

As a special feature of the hereinbefore-described construction there is still to be mentioned that upon the case 1 a lid 70 is screwed, Figs. 4 and 8, on which are fixed the pivots 22 and 23, with the parts turning on the same, the adjustable stop 14, which operates the disconnecting of the annular disks 5 and 6, and the lever 21, with the device for adjusting it higher or lower. This lid is open-worked, as shown in Fig. 8, which greatly facilitates the mounting of the mechanism, as the working of the parts can be perfectly observed. In order to prevent dust getting into the mechanism, another tight-closing lid 71 is placed over lid 70.

What I claim as my invention, and desire to secure by Letters Patent of the United States, is—

1. In an objective-shutter, the combination with a case and two rings in said case encompassing each other, of shutter-plates for the exposure-aperture, actuated by the said rings, an actuating device for one of the two rings, means for coupling the two rings, so that they are adapted to turn in the same direction, means for disconnecting the rings and other means for coupling the rings so that they turn in opposite directions, whereby these coupling means or devices come into operation successively, substantially as set forth.

2. In an objective-shutter, the combination with a case and two rings in the case encompassing each other, of shutter-plates for the exposure-apertures, actuated by the said rings, an actuating device for the outer ring, a latch on the said outer ring adapted to effect a coupling of the same with the inner ring, a stop for releasing the said latch and a two-armed lever pivotable on the case and linked with one of its arms to the said inner ring, whereas the other arm of the said lever is adapted to be turned by the outer ring in certain positions of the same, substantially as set forth.

3. In an objective-shutter, the combination with a case and two rings in the case encompassing each other, of an actuating device for one of the two rings, shutter-plates for the exposure-aperture, which are actuated by one of the rings, devices for coupling the rings and for disconnecting them, so that the same are adapted to be turned successively in the same and in opposite directions, a pivot on the said actuating-ring and a lever arranged movably in the case and in a manner that it can be brought into a line vertical to the plane of the said two rings, so that the same, according to its adjustment, is adapted to either come into contact with the said pivot or let it pass on the ring being turned, substantially as set forth.

4. In an objective-shutter the combination, with a case and two rings in the case encompassing each other, of an actuating device for one of the two rings, shutter-plates for the exposure, actuated by one of the rings, devices for connecting the rings and for disconnecting them, so that the same will be turned successively in the same and in opposite directions, a pivot on the said actuating-ring and a lever with a forked arm arranged movably in the case and the branches of which are, when the lever is in a certain position, adapted to come into contact with the said pivot on the ring carrying the same being turned, substantially as set forth.

5. In an objective-shutter, the combination with a case and two rings in the case encompassing each other, of an actuating device for one of the rings, shutter-plates for the exposure-aperture actuated by the rings, a stop on one of the rings, a two-armed lever actuating a piston slidable in an air-cylinder, a shoulder on the lever which can be brought into the path of the said stop and a device for moving the fulcrum of the said lever radially, substantially as set forth.

6. In a stereoscopic camera, the combination of shutter-plates in each of the two objective-cases which shutter-plates are actuated each by a turnable ring, and of a two-armed lever connecting the rings which actuate the shutter-plates and which lever is journaled betwen the axes of the objectives, the ring in one of the objective-cases being connected to a second ring, provided with a device for connecting or disconnecting the same with the first ring and governed by an actuating device, substantially as and for the purpose set forth.

In testimony whereof I have signed this specification in the presence of two subscribing witnesses.

ERNST BRAUBURGER.

Witnesses:
HENRY HASPER,
WOLDEMAR HAUPT.